US009476346B2

United States Patent
Zoeller et al.

(10) Patent No.: US 9,476,346 B2
(45) Date of Patent: Oct. 25, 2016

(54) COMBUSTION METHOD AND INTERNAL COMBUSTION ENGINE

(71) Applicant: Daimler AG, Stuttgart (DE)

(72) Inventors: Herbert Zoeller, Stuttgart (DE); Naima Seddouk, Aichwald (DE)

(73) Assignee: Daimler AG, Stuttgart (DE)

( * ) Notice: Subject to any disclaimer, the term of this patent is extended or adjusted under 35 U.S.C. 154(b) by 201 days.

(21) Appl. No.: 14/360,108

(22) PCT Filed: Oct. 27, 2012

(86) PCT No.: PCT/EP2012/004510
§ 371 (c)(1),
(2) Date: May 22, 2014

(87) PCT Pub. No.: WO2013/075781
PCT Pub. Date: May 30, 2013

(65) Prior Publication Data
US 2014/0305402 A1   Oct. 16, 2014

(30) Foreign Application Priority Data

Nov. 23, 2011 (DE) .......................... 10 2011 119 215

(51) Int. Cl.
*F02F 3/28* (2006.01)
*F02B 17/00* (2006.01)
*F02B 23/06* (2006.01)

(52) U.S. Cl.
CPC ......... *F02B 17/005* (2013.01); *F02B 23/0651* (2013.01); *Y02T 10/125* (2013.01)

(58) Field of Classification Search
CPC ............ F02B 23/0651; F02B 23/0669; F02B 2023/103; F02B 2023/108; F02B 2275/40; F02F 3/28; F02F 3/285
USPC ................................ 123/298, 301, 307, 661
See application file for complete search history.

(56) References Cited

U.S. PATENT DOCUMENTS 4,721,080 A * 1/1988 Moriyasu ................ F02B 23/06
123/256
5,000,144 A * 3/1991 Schweinzer ........ F02B 23/0672
123/263

(Continued)

FOREIGN PATENT DOCUMENTS

| CN | 101460722 A | 6/2009 |
| DE | 10 2004 055 262 A1 | 5/2006 |

(Continued)

OTHER PUBLICATIONS

Chinese Office Action issued in Chinese counterpart application No. 201280057646.2 dated Sep. 28, 2015, with partial English translation (Sixteen (16) pages).

(Continued)

*Primary Examiner* — Hai Huynh
(74) *Attorney, Agent, or Firm* — Crowell & Moring LLP

(57) ABSTRACT

A combustion process with auto-ignition for direct-injection internal combustion engines involves dividing injection jets at a jet divider contour into a first partial quantity, a second partial quantity, and third partial quantities. The first partial quantity enters into the piston cavity, the second partial quantity enters via the piston step into a region between the piston crown and the cylinder head, and the third partial quantities, starting from the respective injection jet, spread out on both sides in the peripheral direction in opposite directions along the piston step, and the respective third partial quantities collide with one another between two adjacent injection jets within the piston step and are deflected radially inwardly. The first partial quantity and the second partial quantity form a first combustion front and a second combustion front, and the partial quantities which in each case are jointly deflected inwardly form a third combustion front radially inwardly into a gap between the injection jets. The injection jets are deflected upstream from the jet divider contour in the direction of the piston by means of a resultant flow formed essentially from a swirl, a squish gap flow, and a jet flow.

20 Claims, 3 Drawing Sheets

(56) References Cited

U.S. PATENT DOCUMENTS

Figure 1:
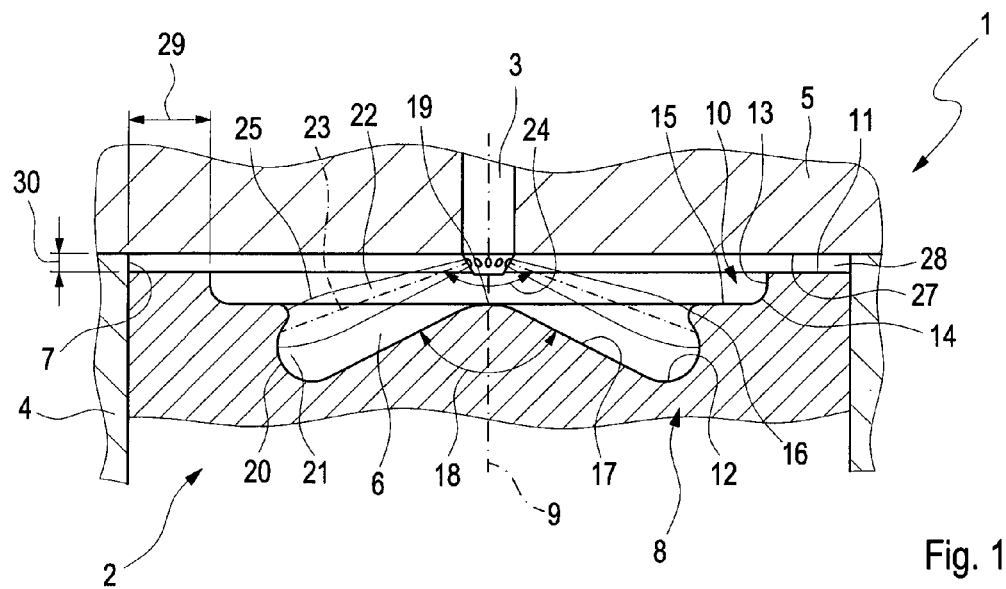

| | | | |
|---|---|---|---|
| 7,156,069 B2 * | 1/2007 | Ono | F02B 23/0696 123/264 |
| 7,415,963 B2 * | 8/2008 | Chmela | F02B 23/0669 123/276 |
| 7,942,126 B2 | 5/2011 | Zoeller | |
| 8,156,927 B2 * | 4/2012 | Iikubo | F02B 23/0672 123/661 |
| 8,327,822 B2 | 12/2012 | Asai et al. | |
| 8,671,908 B2 * | 3/2014 | Ives | F02B 23/0651 123/145 A |
| 9,121,336 B2 * | 9/2015 | Lee | F02B 23/0651 |
| 2011/0023819 A1 * | 2/2011 | Ives | F02B 23/0651 123/298 |
| 2015/0053172 A1 * | 2/2015 | Long | F02B 23/0651 123/298 |
| 2015/0190753 A1 * | 7/2015 | Stroia | B01D 53/9431 422/148 |

FOREIGN PATENT DOCUMENTS

| | | |
|---|---|---|
| DE | 10 2005 055 367 A1 | 6/2006 |
| DE | 10 2006 020 642 A1 | 11/2007 |
| DE | 10 2006 027 338 A1 | 12/2007 |
| DE | 11 2008 002 527 T5 | 8/2010 |
| DE | 10 2009 025 404 A1 | 1/2011 |
| FR | 2958977 * | 4/2010 ............... F02F 3/26 |
| JP | 4-153563 A | 5/1992 |
| JP | 4-272447 A | 9/1992 |
| JP | 2003-056349 A | 2/2003 |
| JP | 2009-535561 A | 10/2009 |
| JP | 2010-101243 A | 5/2010 |
| WO | WO 2004/057168 A1 | 7/2004 |
| WO | WO 2009/112170 A1 | 9/2009 |

OTHER PUBLICATIONS

Japanese Office Action dated May 13, 2015, with partial English translation (Eight (8) pages).
International Search Report (PCT/ISA/210) dated Mar. 20, 2013, with English translation (Five (5) pages).
German language Written Opinion (PCT/ISA/237) dated Mar. 20, 2013 (Six (6) pages).

* cited by examiner

COMBUSTION METHOD AND INTERNAL COMBUSTION ENGINE

BACKGROUND AND SUMMARY OF THE INVENTION

Exemplary embodiments of the present invention relate to a combustion process with auto-ignition for direct-injection internal combustion engines and to an internal combustion engine, in particular for a motor vehicle, for carrying out such a combustion process.

German patent document DE 10 2006 020 642 A1 discloses an auto-ignition internal combustion engine for implementing a combustion process in which the internal combustion engine has at least one cylinder whose combustion chamber is laterally delimited by a cylinder wall, and is delimited axially on the one hand by a cylinder head, and axially on the other hand by an adjustable-stroke piston in the cylinder. The cylinder wall defines a longitudinal center axis of the cylinder. In addition, the internal combustion engine includes one injection nozzle per cylinder which is situated coaxially with respect to the combustion chamber, i.e., situated in the cylinder head essentially coaxially with respect to the longitudinal center axis. The particular piston is designed as a stepped piston having an annular circumferential piston step that is axially recessed in the piston relative to an annular piston crown, and which via an annular circumferential jet divider contour merges into a piston cavity which is axially recessed in the piston relative to the piston step. The particular injection nozzle is designed in such a way that for a combustion operation it is able to simultaneously inject multiple injection jets into the combustion chamber in a star-shaped pattern. In the known combustion process, the injection jets are each divided at the jet divider contour into a first partial quantity that essentially enters into the piston cavity, and a second partial quantity that spreads out essentially over the piston crown via the piston step in the direction of the cylinder wall and the cylinder head. A first combustion front and a second combustion front are formed by the first partial quantity and the second partial quantity, respectively. In addition, after striking the jet divider contour in the piston step, the respective injection jets are each divided into third partial quantities which, starting from the particular injection jet, spread out essentially on both sides in the peripheral direction in opposite directions along the piston step. In the further course of the combustion process, the respective third partial quantities collide with one another in each case in the peripheral direction between two adjacent injection jets within the piston step and are deflected radially inwardly. The formation and guiding of these third partial quantities are brought about by the injection jets striking the jet divider contour and the piston step. Due to the third partial quantities moving away from the piston step, a third combustion front is formed which essentially spreads out radially into a gap formed in the peripheral direction between adjacent injection jets. This type of combustion process may also be referred to as a "triple front combustion process," since essentially three combustion fronts or flame fronts in each case spatially spread out in the combustion chamber for each injection jet.

Since the combustion fronts make effective use of the available space in the combustion chamber, the known combustion process utilizes to a great extent the fresh gas or fresh gas-exhaust gas mixture that is available in the combustion chamber, which significantly reduces the soot formation during the combustion. In addition, due to the combustion of the third combustion front in a time-delayed manner compared to the first two combustion fronts, local peak temperatures are lowered, thus reducing NOx formation.

For forming the third combustion front, the third partial quantities of adjacent injection jets in the piston step collide with one another with high momentum. The momentum of the third partial quantities is formed from the product of the mass of the third partial quantities and their velocity. If the momentum of the third partial quantities is sufficiently high, when the third partial quantities collide with one another in the piston step they are deflected into the combustion chamber, starting from the space that is spanned or opened by the piston step. The respective third partial quantities that are deflected together form a third combustion front oriented essentially in the direction of the longitudinal center axis between the respective injection jets. A high rate of turbulence is advantageously generated in the combustion chamber by means of the third combustion front, so that the compatibility with exhaust gas recirculated into the combustion chamber increases, as the result of which the NOx emissions may be further reduced by means of the increased EGR portion in the combustion chamber. However, in the known combustion process, only a small time window or only a small crank angle is available for dividing the injection jets at the jet divider contour into optimally dimensioned three partial quantities, so that optimal conditions for forming the third combustion front are present in only a few load and speed ranges, as the result of which the soot emissions in particular cannot be reduced to the desired degree compared to conventional diesel combustion.

Exemplary embodiments of the present invention are directed to an improved auto-ignition combustion process and an internal combustion engine which is suitable for this purpose, characterized by an improved division of the introduced fuel into the three partial quantities. For downwardly moving pistons, it is thus possible to maintain the combustion process for a longer period of time than heretofore.

The invention is based on the general concept of deflecting the injection jets in the direction of the piston in an area situated upstream from the jet divider contour. As a result of this measure, during the beginning expansion stroke the injection jets may be deflected toward the piston, which is moving away from the cylinder head. Consequently, the injection jets may continue to strike the jet divider contour or the piston in the area of the jet divider contour, even when the piston is moving away from the cylinder head, in order to still divide the particular injection jet into three partial quantities. As a result, a longer time period or an increased crankshaft angle is available for the optimal division of the particular injection jets. By varying the injection duration, injection pressure, and injection timing, in particular at the start of injection, third partial quantities having a sufficiently large fuel mass and fuel velocity, and thus a sufficiently high inherent momentum of the third partial quantities, may be reproducibly generated over an extended characteristic map range, so that the third combustion front may form in a gap between two adjacent injection jets and thus make optimal use of spatially distributed combustion air or a combustion air-exhaust gas in the combustion chamber, as the result of which the soot emissions in particular may be reduced. In addition, by deflection of the injection jet according to the invention, the wetting of the cylinder wall with fuel from the second partial quantity is at least greatly reduced, since the injection jet essentially strikes the jet divider contour or adjoining areas of the piston and does not spread over the piston crown or directly strike the cylinder wall. In addition, by means of the piston step, the third partial quantities are separated from the respective injection jets, so that less fuel is available for the second partial quantity, as the result of which the momentum inherent to the second partial quantity becomes lower, and therefore the penetration depth of the second partial quantity is reduced. In addition, the axial deflection of the second partial quantity in the piston step toward the cylinder head results in damming of the second partial quantity between the cylinder head and the piston, so that the fuel flowing into the second combustion front due to the injection is decreased, thus decelerating the radial spreading of the second partial quantity or the second combustion front. By means of these two effects, contact of the second combustion front with the relatively cold cylinder or cylinder wall may advantageously be minimized, thus greatly decreasing the undesirable heat transfer between the second combustion front and the cylinder wall, so that soot formation from the second combustion front at the relatively cold cylinder wall may be reduced. In addition, washout of oil from the cylinder wall and infiltration of soot into the engine oil may be decreased.

According to the present invention, by means of a squish gap flow, a swirl flow, and a jet flow, a resultant flow is generated whose flow vector includes at least one essential portion that forms above the piston cavity, coaxially with respect to the longitudinal center axis of the cylinder in the direction of the piston cavity. This forms the squish gap flow between the piston crown and the cylinder head, which is oriented essentially from the cylinder wall toward the center of the cylinder. The swirl flow, i.e., the swirl of the combustion air, is directed essentially about the longitudinal center axis of the cylinder. The jet flow is formed in the course of the injection jet that spreads out in the combustion chamber, the combustion air that surrounds the injection jet being entrained in the direction of the injection jet. The resultant flow strikes the injection jets above the piston cavity, shifted radially inwardly with respect to the jet divider contour, i.e., upstream from the jet divider contour, and deflects in the direction of the piston.

According to one advantageous embodiment, the injection jets are injected so that they first strike the jet divider contour off-center, namely, offset toward the piston cavity, in the course of the injection spread over the center of the jet divider contour, and lastly, strike the jet divider contour offset toward the piston step. In other words, the propagating injection jets do not first strike the jet divider contour, offset on the jet divider contour toward the piston step, but, rather, strike the jet divider contour only in the further course of the injection, so that the injected quantity of fuel may be optimally divided into a first partial quantity, a second partial quantity, and third partial quantities, as the result of which the third partial quantities in particular acquire sufficiently high momentum and are able to form as the third combustion front when they collide. This does not change with the expansion stroke of the piston, which moves away from the cylinder head; instead, the deflection of the injection jets according to the invention in the direction of the piston essentially off-center, offset with respect to the piston step, is maintained, as the result of which the largest possible fuel mass enters into the piston step at high velocity, and in third partial quantities spreads out in the piston step in the peripheral direction.

According to one advantageous embodiment, the injection jets are injected in such a way that they initially strike the jet divider contour off-center, namely, offset toward the piston cavity, and in the course of the injection subsequently strike the jet divider contour when the piston is moving downwardly. This applies for injection quantities that have short injection durations as a function of the injection pressure, so that the injection jet strikes the jet divider contour at the end of its injection duration. The resultant flow according to the invention to the injection jet also advantageously acts for smaller injection quantities, as the result of which the injected quantity of fuel may still be optimally divided into a first partial quantity, a second partial quantity, and third partial quantities.

According to another advantageous embodiment, by means of the respective injection nozzle 7 to 12, preferably 10 to 12, in particular 10, injection jets may be generated at the same time. The mentioned number of injection jets results in a small angle between the injection jets, so that the adjacent step jets that are moving toward one another at the piston step must cover comparatively short distances in the piston step, so that the third partial quantities lose little velocity and collide with a particularly high momentum, and the third combustion front may be formed in a particularly effective manner.

In one particularly advantageous embodiment, the particular injection jet is introduced during an injection duration of 40 crankshaft angle degrees maximum. Particularly stable combustion may thus be achieved, since the three above-mentioned flame fronts may thus be implemented in a particularly reliable manner.

According to another advantageous embodiment, the injection jets may be injected at a spray cone angle in an angular range of, for example, approximately 140° to approximately 160°, preferably approximately 152°.

It is particularly advantageous when the spray cone angle spreads out essentially coaxially with respect to the longitudinal center axis of the cylinder, so that the injection jets in each case strike at the same height of the jet divider contour, as the result of which the third combustion fronts may uniformly spread out toward one another in the combustion chamber.

In another advantageous embodiment, the injection jets are introduced into the combustion chamber at an injection pressure of 500 bar to 2800 bar. The injection jets advantageously have a high velocity during spraying into the combustion chamber, so that the injection jets have a high inherent momentum, thus simplifying formation of the third combustion front.

In one particularly advantageous design, the first partial quantities are deflected in an undercut in the piston cavity. The jet divider contour thus protrudes radially inwardly beyond an outer wall of the piston cavity. The first partial quantities, i.e., the first combustion front of the respective injection jets, flow over the undercut in the direction of the center of the piston, starting from the jet divider contour. Due to the improved deflection essentially tangentially with respect to the undercut in the direction of the longitudinal center axis, the first partial quantities advantageously exit at the transition of the undercut into the piston cavity base or a piston cone, resulting in an improved distribution of the first partial quantities in the combustion air in the piston cavity, as the result of which the effectiveness of the combustion may be increased, and the emissions may be further reduced.

In one particular design of the undercut, the undercut is up to 3% of a piston diameter.

The swirl flow may be generated within the combustion air in the combustion chamber by means of an appropriate configuration and/or orientation of the intake openings and/or the intake ducts, and/or by appropriate contouring in the area of the valve seats of the intake valves. It is also known to generate swirl by means of swirl flaps in the intake duct, or a combination of swirl flaps and a device mentioned above. By means of the swirl of the combustion air, a resultant flow may be formed that deflects the injection jets in the direction of the piston. In addition, in particular the intermixing of combustion air and recirculated exhaust gas is enhanced, since the charge in the cylinder is moved about the longitudinal center axis by means of the swirl flow.

For generating a charge, acted on by swirl, of fresh air or fresh air and recirculated exhaust gas in the combustion chamber after a charge exchange, the internal combustion engine may be equipped with suitable swirl generation means. Examples of such swirl generation means include the measures mentioned above.

The swirl in the charge may be generated with an i-theta of up to 4.5 maximum. In particular for utility vehicle engines, a comparatively low swirl of 0.3 to 2.5 may be sufficient to generate the desired resultant flow. For smaller-displacement engines, a higher swirl of up to 4.5 may be practical.

In one particular embodiment the swirl may be changeable. In this way the swirl may be advantageously adapted to the operating conditions, so that further degrees of freedom with regard to the deflection of the injection jets may be obtained, as the result of which the deflection of the injection jets according to the invention may be used in an extended characteristic map range for stabilizing the deflection. For example, the swirl in smaller-displacement engines may be increased under partial load and decreased under full load.

According to another advantageous embodiment, as mentioned, a squish gap may be present in the particular cylinder at top dead center of the piston, axially between the piston crown and the cylinder head; at top dead center of the piston, axially between the piston crown and the cylinder head, the squish gap has an axial height in a range of approximately 0.2% to approximately 3.0% of the piston diameter, preferably in a range of approximately 0.4% to approximately 1.2% of the piston diameter, and/or has a radial length in a range of approximately 6% to approximately 22% of the piston diameter, preferably in a range of approximately 9% to approximately 14% of the piston diameter. These dimensions of the squish gap have proven to be particularly advantageous for generating a squish gap flow which is suitable for generating the resultant flow.

In another advantageous embodiment, the piston step has a radial extension of 4% to approximately 20% of a piston diameter, and an axial height of approximately 2.5% to 7% of the piston diameter. This design of the piston step has proven to be particularly effective in forming the third combustion front.

In another advantageous embodiment, the injection holes of the injection nozzle for generating the injection jets have a ratio of the hole length to the hole diameter which is in a range of approximately 3 to approximately 11, and preferably in a range of approximately 4 to approximately 8.

In another advantageous embodiment, the injection holes have a rounding at an intake side facing away from the combustion chamber. By means of the rounding, in particular a rounding produced by hydraulic erosion, a flow increase in a range of 5% to 25%, preferably in a range of 10% to 20%, is achieved.

In another embodiment, the injection holes have a conical design and taper from the intake side to the exhaust side.

In one particular embodiment of the conical injection holes, a hole diameter at the intake side, optionally downstream from the rounding, is larger than a hole diameter at the exhaust side in a range of approximately 2% to approximately 25%, preferably in a range of approximately 5% to approximately 15%.

An elongated, relatively narrow, lobe-shaped injection jet having a high propagation rate may advantageously be generated by means of the conical injection holes, so that the injection jet spreads out only slightly in the combustion chamber, and the injection jet may thus strike the jet divider contour with high momentum.

In another advantageous embodiment, the piston is also equipped with a piston cone situated coaxially and centrally in the piston cavity. The piston cone advantageously has a cone angle that is smaller than a spray cone angle of the injection jets. For example, the cone angle may be approximately 124°±10°, in particular approximately 124°±5°. An apex of the piston cone through which the longitudinal center axis of the piston or the cylinder extends is axially offset toward the piston with respect to the piston crown and preferably also with respect to the piston step; i.e., the cone apex is axially recessed in the piston relative to the piston crown and in particular also relative to the piston step.

It is understood that the features mentioned above and to be explained below may be used not only in the particular stated combination, but also in other combinations or alone without departing from the scope of the present invention.

BRIEF DESCRIPTION OF THE DRAWING FIGURES

Preferred exemplary embodiments of the invention are illustrated in the drawings and explained in greater detail in the following description; identical or functionally equivalent components are denoted by the same reference numerals.

Figure 2:
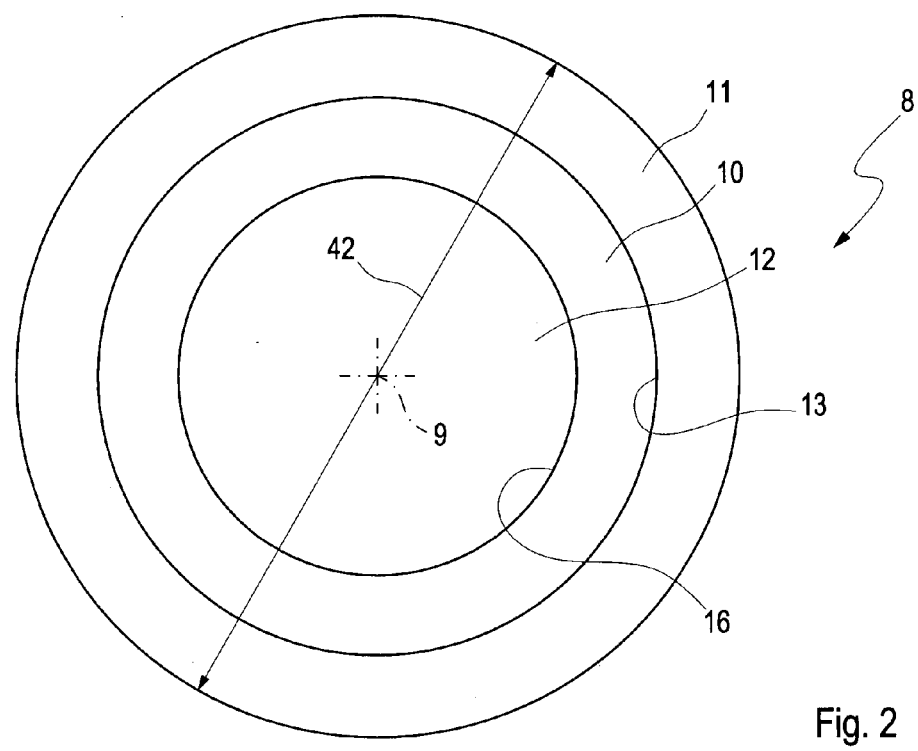
Figure 4:
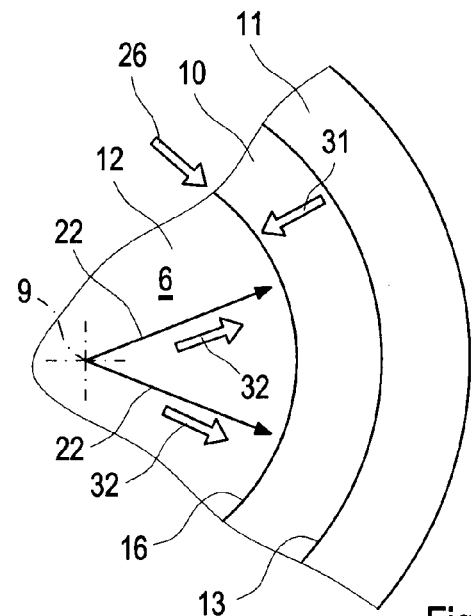
Figure 3:
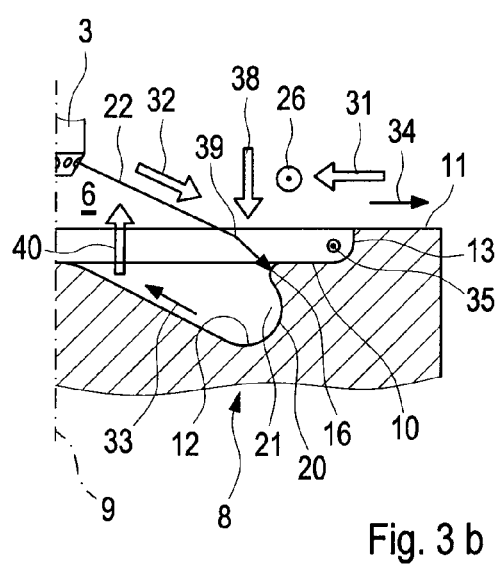
Figure 4:
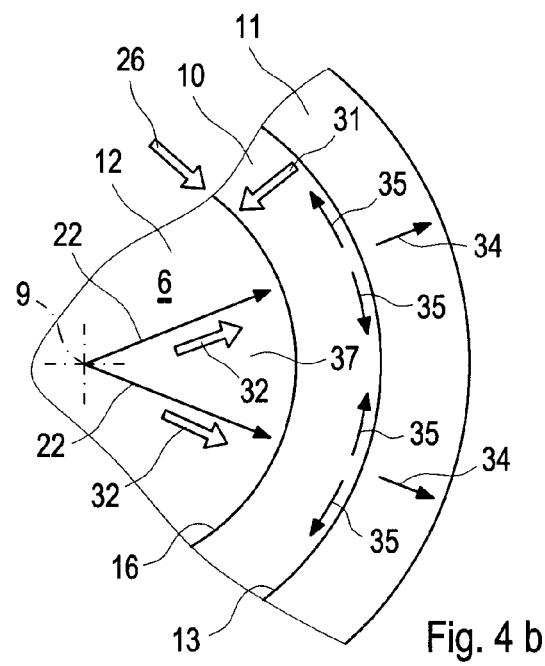
Figure 3:
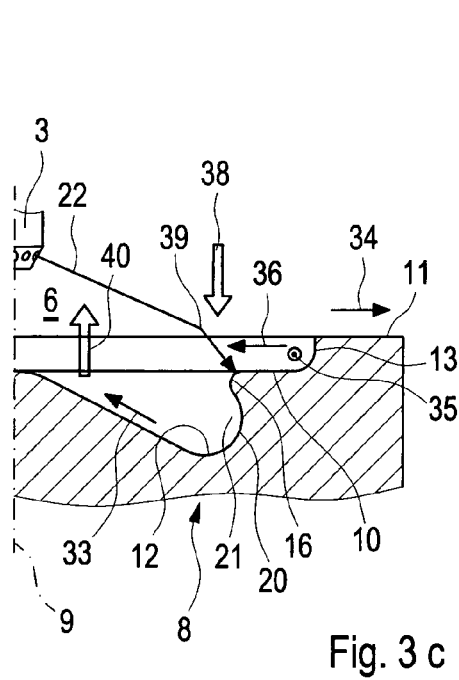
Figure 4:
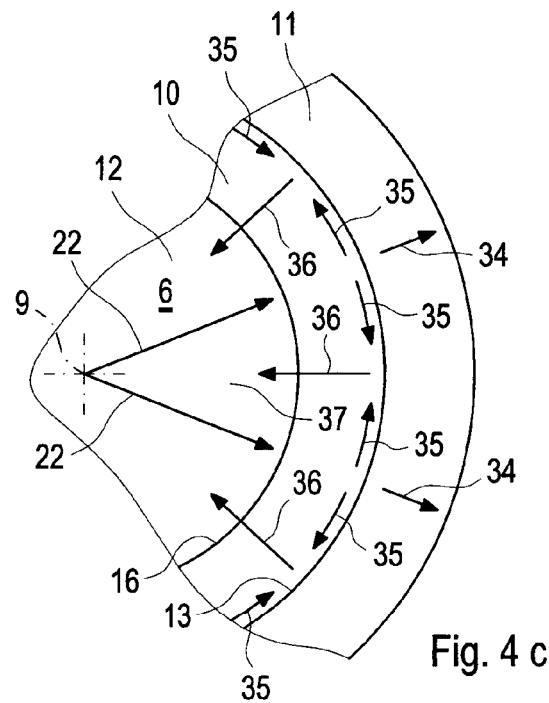
Figure 5:
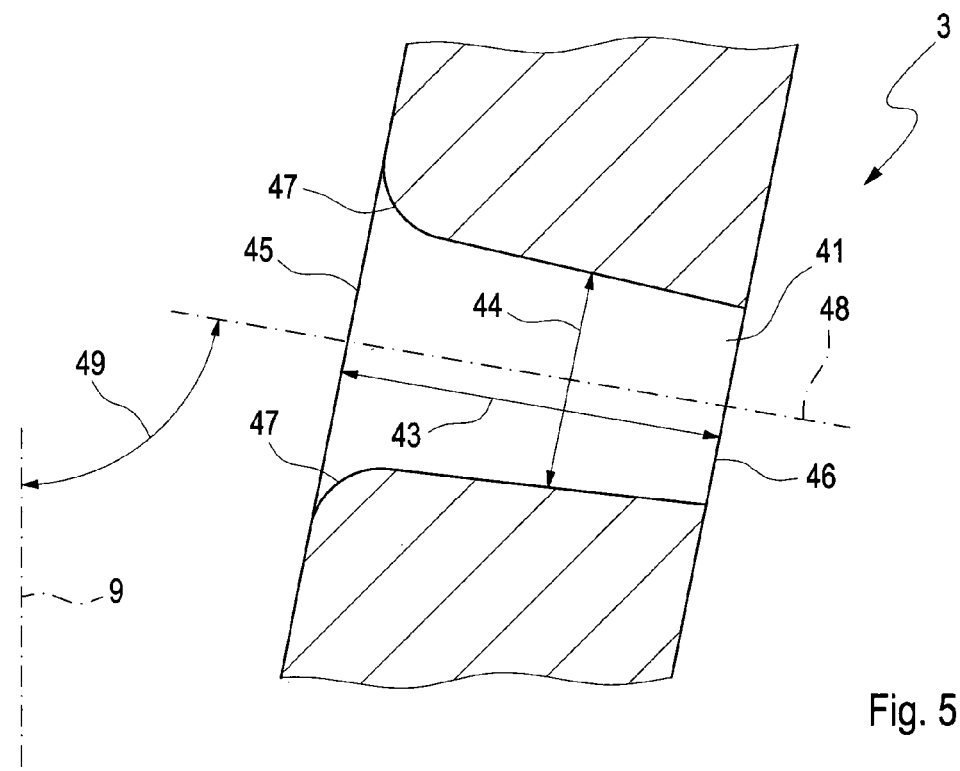

The drawings show the following, in each case in a schematic manner:

FIG. 1 shows a longitudinal section of an internal combustion engine in the region of a cylinder, FIG. 2 shows an axial top view of a piston, FIGS. 3a, 3b, 3c show simplified semi-longitudinal sections of the piston from FIG. 1 in various states a through c of a combustion process, FIGS. 4a, 4b, 4c show details of the top view from FIG. 2 in various states a through c of the combustion process, and FIG. 5 shows a greatly simplified longitudinal section of an injection nozzle in the region of an injection hole.

DETAILED DESCRIPTION

According to FIG. 1, an internal combustion engine 1, which in particular may be used in a motor vehicle, specifically, in a utility vehicle or also a passenger vehicle, includes at least one cylinder 2 and one injection nozzle 3 of an injector, not illustrated in greater detail, per cylinder 2. The internal combustion engine 1 is illustrated in FIG. 1 only in the region of such a cylinder 2. In principle, the internal combustion engine 1 may also have more than one cylinder 2. The particular cylinder 2 is provided in a crankcase 4 on which a cylinder head 5 is situated in a customary manner.

In the particular cylinder 2, a combustion chamber 6 is laterally delimited by a cylinder wall 7, and is delimited axially on the one hand by the cylinder head 5 and axially on the other hand by a piston 8 situated in the cylinder 2 in an adjustable-stroke manner. The cylindrical cylinder wall 7 defines a longitudinal center axis 9 of the cylinder 2. In the example, the injection nozzle 3 is situated in the cylinder head 5 coaxially with respect to the combustion chamber 6.

According to FIGS. 1 and 2, the piston 8 is designed as a stepped piston. This type of stepped piston 8 has an annular circumferential piston step 10 with respect to the longitudinal center axis 9, an annular circumferential piston crown 11 with respect to the longitudinal center axis 9, and a piston cavity 12 situated coaxially with respect to the longitudinal center axis 9. The piston step 10 is axially recessed in the piston 8 relative to the piston crown 11. The piston cavity 12 is axially recessed in the piston 8 relative to the piston step 10. The cross section of the piston step 10 is angled, and has an axially circumferential step wall 13 that merges into a radially flat step base 15 via a concavely curved transition wall 14. The step wall 13 merges into the flat piston crown 11. The step base 15 is adjoined by a rounded edge region, referred to below as the jet divider contour 16, which merges into the lower-level piston cavity 12. The step wall 13, the transition wall 14, the step base 15, and the jet divider contour 16 have an annular, in particular circular, circumferential design with respect to the longitudinal center axis 9.

The piston 8 also has a piston cone 17 integrally molded coaxially and concentrically within the piston cavity 12. The piston cone 17 has a cone angle 18 and tapers toward the cylinder head 5. A cone apex 19 is recessed in the piston 8 relative to the piston crown 11. In the exemplary embodiment, the piston crown 11 extends in a plane running perpendicularly with respect to the longitudinal center axis 9. In addition, the piston step 10 extends along its important area in a plane that is perpendicular to the longitudinal center axis 9.

In the exemplary embodiment according to FIG. 1, the jet divider contour 16 protrudes slightly radially inwardly beyond a radially outer wall 20 of the piston cavity 12. The piston cavity 12 thus has an undercut 21 with respect to the jet divider contour 16.

The jet divider contour 16 is designed in the form of a rounded, annular circumferential projection between the step base 15 and the outer wall 20 of the piston cavity 12. If no undercut 21 is provided, the jet divider contour 16 may also be designed as a rounded, annular circumferential edge, having essentially a rectangular cross section, between the step base 15 and the outer wall 20 of the piston cavity 12.

As shown in FIG. 1, the injection nozzle 3 is designed in such a way that it may simultaneously generate multiple injection jets 22 that spread out from the injection nozzle 3 in a star-shaped pattern with respect to the longitudinal center axis 9, essentially radially into the combustion chamber 6. It is important that the injection jets 22 spread out coaxially with respect to the longitudinal center axis 9 with increasing radial distance. The particular injection jet 22 strikes along an inclined longitudinal center axis 23, which defines a direction of propagation of the particular injection jet 22. The injection jets 22 collectively have a cone contour which has a spray cone angle 24. The individual injection jets 22 in each case spread out in the combustion chamber 6 in a lobe-shaped manner. A corresponding lobe contour is denoted by reference numeral 25 in FIG. 1.

For the following discussion, the individual injection jets 22 as well as the resulting further jets or partial quantities are illustrated in a simplified manner as arrows. It is clear that the injection jet 22 and the individual partial quantities that separate from the injection jet 22 each represent a propagating fuel vapor cloud, i.e., a cloud composed of combustion air and fuel, which at least on its exterior is already able to react with the oxygen in the combustion chamber 6, and thus forms a flame front, i.e., a burning fuel-air mixture. It is also clear that the injection jet 22 initially carries along fuel in mostly liquid form essentially along its longitudinal center axis 23, and forms a fuel-air mixture with the combustion air in the combustion chamber 6 only at its edges, the liquid fuel further evaporating and mixing with the combustion air in the course of the combustion.

The combustion process according to the invention, which operates with auto-ignition, in particular with diesel fuel or the like, is explained in greater detail with reference in particular to FIGS. 3 and 4. A charge exchange takes place in the particular cylinder 2 in a customary manner for preparation for the combustion operation, so that a charge composed of fresh air or a charge composed of fresh air and recirculated exhaust gas is subsequently present in the particular combustion chamber 6. The charge composed of fresh air or fresh air and recirculated exhaust gas in the combustion chamber 6 is also acted on by a swirl 26, which is indicated by a block arrow in FIGS. 4a through 4c. The swirl 26 or the swirl flow thus corresponds to a rotation of the charge about the longitudinal center axis 9, i.e., to a flow in the peripheral direction. In addition, all flows, i.e., the important directional vectors of the individual flows of the charge in the combustion chamber 6, are symbolized by block arrows. Furthermore, the injected fuel, i.e., the injection jet 22, and the partial quantities that separate therefrom are symbolized by line arrows. The arrows symbolize the important directional vectors.

As shown in FIG. 1, during the compression stroke the piston 8 is at its maximum approach to the cylinder head 5, resulting in a squish gap 28 axially between the piston crown 11 and an annular area 27 of the cylinder head 5 axially opposite from the piston crown 11, the squish gap having a squish gap length 29 measured in the radial direction and a squish gap height 30 measured in the axial direction. The squish gap length 29 essentially corresponds to the radial distance between the cylinder wall 7 and the step wall 13. The squish gap height 30 corresponds to the axial distance between the annular area 27 and the piston crown 11 at top dead center of the piston 8.

In the region of top dead center, the movement of the piston 8 toward the cylinder head 5 generates a squish gap flow 31, known per se, which is indicated by a block arrow in FIGS. 3a through 3c. The squish gap flow 31 is oriented essentially radially toward the longitudinal axis 9. It is clear that a squish gap flow 31 cannot arise for a piston 8 that is moving away from the cylinder head 5. However, due to the mass inertia of the charge in the combustion chamber 6, or the portion of the charge in the combustion chamber 6 that is acted on by the squish gap flow 31, for a piston 8 attempting to move downwardly the squish gap flow 31 formed during the compression stroke is still present, and is effective at least until the end of the injection.

According to FIGS. 3a and 4a, for a combustion operation in auto-ignition mode the injection nozzle 3 simultaneously generates multiple injection jets 22 that spread out into the combustion chamber 6 in a star-shaped pattern. With regard to the spray cone angle 24, the injection jets 22 are coordinated with the position of the piston 8 at the time of injection in such a way that the injection jets 22 are offset eccentrically, namely, toward the undercut 21 or toward the outer wall 20 of the piston cavity 12, and do not directly strike the jet divider contour 16, so that they are situated in the area between the outer wall 20 and the jet divider contour 16. In FIG. 1 this is clearly shown by the longitudinal center axis 23 of the injection jets 22 at the point in time when the injection jets 22 first strike the jet divider contour 16. At this point in time the swirl flow 26, the squish gap flow 31, and a jet flow 32 are present in the combustion chamber 6. The jet flow 32 is a flow of the charge resulting from entrainment of the combustion air surrounding the injection jets 22. The jet flow 32 is symbolized by a block arrow between the injection jet 22 and the cylinder head 5, and has a distinct directional vector extending essentially parallel to the longitudinal center axis 23 of the injection jet 22. The swirl 26 has a distinct directional vector, symbolized by its block arrow, which is oriented tangentially with respect to the longitudinal center axis 9 or to the piston 8. The squish gap flow 31 has a distinct directional vector, symbolized by its block arrow, which extends transversely with respect to the direction of the longitudinal center axis 9.

According to FIGS. 3b and 4b, in the further course of the injection the injection jet 22 striking the jet divider contour 16 is divided into a first partial quantity 33, a second partial quantity 34, and third partial quantities 35. The piston 8 has moved farther from the cylinder head 5 or the injection nozzle 3, so that when the injection jet 22 strikes the jet divider contour 16, the injection jet now migrates toward the center of the jet divider contour 16 or toward the step base 15. The first partial quantity 33 strikes in the piston cavity 12. The second partial quantity 34 flows over the piston crown 11 via the piston step 10 in the direction of the cylinder wall 7 and the cylinder head 5 or the annular area 27 of the cylinder head 5. The third partial quantities 35 flow opposite one another in the piston step 10, starting from the longitudinal center axis 23 of the injection jet 22, along the piston step 10. Upon striking the step wall 13, the third partial quantities 35 are divided from the injection jet 22 and flow to the left and to the right. In FIGS. 3b and 3c, the important directional vectors of the third partial quantities 35 are illustrated by large dots, and the important directional vector of the swirl 26 is illustrated by a circle with a dot in the center. The first partial quantities 33 are not illustrated in FIGS. 4b and 4c for the sake of clarity. The first partial quantity 33 forms a first important flame front in the combustion chamber 6. The second partial quantity 34 forms a second important flame front in the combustion chamber 6. The fuel separated from the injection jet 22 has essentially mixed with the combustion air in the combustion chamber 6 and ignited.

According to FIG. 4c, in the further course of combustion, within the piston step 10 two injection jets 22 that are adjacent in the peripheral direction may now collide with a third partial quantity 35 of one injection jet 22 and with a third partial quantity 35 of the adjacent injection jet 22 in the peripheral direction, and may combine to form a third combustion front 36 that spreads out radially away from the step wall 13 of the piston step 10, radially inwardly into a gap 37 that forms in the peripheral direction between every two adjacent injection jets 22. The combining third partial quantities 35 of two adjacent injection jets 22 form the third important flame front in the combustion chamber 6.

Thus, a total of three important spatially propagating flame fronts are present in the combustion chamber 6, so that the combustion process may therefore be referred to as a triple front combustion process.

For stable formation of the third combustion front 36, it is important that the third partial quantities 35 have sufficient fuel mass and a high velocity for a sufficiently high momentum. This is assisted by a deflection according to the invention of the injection jet 22 from the piston 8 that is moving away from the cylinder head 5. Due to the deflection, the fuel introduced into the combustion chamber 6 by the injection jet 22 may still strike the jet divider contour 16 in such a way that the fuel may be optimally divided for forming the three partial quantities 33, 34, 35. According to the invention, a resultant flow 38 results from the respective important directional vectors of the swirl 26, the squish gap flow 31, and the jet flow 32. The resultant flow 38 has at least one important directional vector or one important flow component that forms in the area between the injection jets 22 and the cylinder head 5, symbolized by a block arrow 38 in FIGS. 3b and 3c. According to FIGS. 3b and 3c, the resultant flow 38 now strikes the particular injection jet 22 upstream from the jet divider contour 16, and deflects the injection jet toward the piston 8. As a result, with regard to its striking the jet divider contour 16, due to the resultant flow 38 the injection jet 22 may, in a manner of speaking, track the movement of the piston 8, which is already in its expansion stroke and consequently is at an increasingly farther distance from the cylinder head 5. The flow dynamic tracking and deflection of the injection jets 21 toward the piston 8 implemented here always take place at the correct time, after the injection jets 22 first strike the jet divider contour 16.

Figure 3:
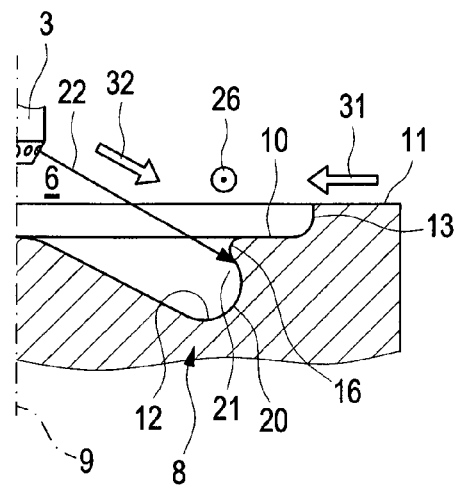

For explaining the various flows 26, 31, and 32 and the resultant flow 38 that thus forms, i.e., the important directional vector illustrated in FIGS. 3b and 3c, in the illustration in FIG. 3b all flows 26, 31, 32, and 38 are shown as block arrows. For the sake of clarity, only the resultant flow 38 according to the invention is illustrated in FIG. 3 c, and no flow is illustrated in FIG. 4c. The resultant flow 38 causes the injection jets 22 to track the piston 8, which is moving away from the cylinder head 5 or the injection nozzle 3, in that the injection jet 22 is deflected or curved upstream from the jet divider contour 16 in the direction of the piston 8, by means of the resultant flow 38. In FIGS. 3b and 3c, for the sake of clarity the continuous curvature of the injection jet 22 is symbolized in each case by a bend 39 in the jet.

It should be noted that the triple front combustion process ensures a combustion sequence in which three combustion fronts 33, 34, 36 may be continuously supplied with fuel or a mixture of fuel and the charge in the combustion chamber 6 until the end of the injection. The first combustion front 33 and the second combustion front 34 form first, followed by the third combustion front 36. In the chronological sequence of these continuous processes, the injection jet 22 spreads over the jet divider contour 16 until ultimately the injection jet 22 strikes the jet divider contour 16 more or less precisely in the direction of the step base 15, or at the step base 15. In the course of this process, the resultant flow 38 forms, and forces the longitudinal center axis 23 of the injection jet 22 further into the area of the jet divider contour 16, so that the longitudinal center axis 23 of the injection jet 22 is not able to spread over the step wall 13 or even strike the piston crown 11, as the result of which the second partial quantity or combustion front 34 remains relatively small, the cylinder wall 7 is not significantly contacted, and a sufficiently large quantity of fuel is available for the third partial quantities 35.

The striking of the piston 8 by the injection jet 22 and the division of an injection jet 22 into its three partial quantities 33, 34, 35, illustrated in FIGS. 3a through 3c and 4a through 4c, applies for large injection quantities with correspondingly long injection durations, naturally as a function of the injection pressure and the start of injection. If the injection quantity is smaller than that in full load operation of the internal combustion engine, for example, the duration of the injection is also generally correspondingly shorter. It is possible that the injection jet 22 may only partially spread over the jet divider contour 16, as shown in FIG. 3b, before the injection is completed. The resultant flow 38 according to the invention also acts on such an injection jet 22, although at the end of its injection duration the injection jet does not strike the jet divider contour 16 with an offset with respect to the piston step 10. The creation of the third combustion front 36 may still take place, as shown in FIG. 4c, since the injection jet 22 has a lobe contour 25, i.e., a lobe-shaped mixture cloud having a lobe contour 25 which surrounds the longitudinal center axis 23 of the injection jet 22, and at the jet divider contour 16 this mixture cloud is divided into the first partial quantity 33, which flows into the piston cavity 12, and the second partial quantity 34 and the third partial quantities 35, which flow in the direction of the piston step 10.

The piston cavity 12 beneath the jet divider contour 16 has an undercut 21 in the area of the outer wall 20. Due to the essentially radially formed undercut 21, the first partial quantities 33 of the particular injection jets 22 which enter into the piston cavity 12 are deflected in the area of the undercut 21, so that the first partial quantities 33 exit the undercut 21 transversely with respect to the direction of the longitudinal center axis 9. This at least results in spreading out of the first partial quantities 33 essentially in parallel to the piston cone 17. This may also result in slight detachment of the first partial quantity 33 from the piston cone 17, since a longitudinal flow 40 having a distinct directional vector that is oriented essentially parallel to the longitudinal center axis 9 in the direction of the cylinder head 5 may occur in the combustion chamber 6, and deflects the first partial quantities 33 in the direction of the cylinder head 5. The longitudinal flow 40 is denoted by a block arrow in FIGS. 3b and 3c. This detachment of the first combustion front 33 is symbolized in FIGS. 3b and 3c by an arrow which is moving away from the piston cone 17. In this way, contact of the first partial quantities 33 with the piston cone 17 may advantageously be greatly reduced, so that heat cannot be withdrawn from the first partial quantities 33 as the result of contact with the piston 8 in the area of the piston cone 17, and improved intermixing with the charge present in the combustion chamber 6 may take place, which once again improves the overall efficiency of the combustion.

For implementing the triple front combustion process presented here, with appropriate deflection of the particular injection jet 22 provided chronologically with respect to the position of the piston 8, it has proven to be particularly advantageous for the particular injection nozzle 3 to have 7 to 12, preferably 10 to 12, in particular 10, injection holes 41, one of which is shown by way of example in FIG. 5. Correspondingly, the respective injection nozzle 3 may generate 7 to 12, or 10 to 12, preferably exactly 10, injection jets 22.

The injection holes 41 of the injection nozzle 3 are oriented with respect to the longitudinal center axis 9 in such a way that, for example, the spray cone angle 24 may be in an angular range of approximately 140° to approximately 160°. However, a spray cone angle of 152°±1° is preferred.

The swirl 26 advantageously moves in an i-theta range which extends from approximately 0.3 to approximately 4.5, preferably from approximately 0.8 to 2.5. This i theta swirl number may be determined in a known manner, for example by means of the rectifier swirl measurement method according to Tippelmann.

The configuration and orientation of an intake duct and the design of an intake opening constitute typical swirl generation means. Likewise, a valve seat of an intake valve may be configured for swirl generation. In addition, it is known to provide swirl flaps in intake ducts. The options for swirl generation are well known, and are not discussed in further detail.

The squish gap 28 may advantageously have a squish gap height 30 which may be in the range of approximately 0.3% to approximately 2.5% of a piston diameter denoted by reference numeral 42 in FIG. 2. The squish gap height 30 is preferably in a range of 0.5% to approximately 1.2% of the piston diameter 42. The squish gap length 29 is advantageously in a range of approximately 6% to approximately 22% of the piston diameter 42, and preferably in a range of approximately 9% to approximately 14% of the piston diameter 42.

According to FIG. 5, the particular injection hole 41 has a hole length 43 and a hole diameter 44. A ratio of the hole length 43 to the hole diameter 44, which is in a range of approximately 3.0 to approximately 11.0, and preferably in a range of approximately 4.0 to approximately 8.0, has proven to be particularly advantageous. In the example shown in FIG. 5, the particular injection hole 41 has a conical design such that it tapers from an intake side 45 to an exhaust side 46. Accordingly, the hole diameter 44 varies along the hole length 43. In particular, the hole diameter 44 at the intake side 45, optionally downstream from a rounding 47, may be approximately 2% to approximately 25%, preferably approximately 5% to approximately 15%, larger than the hole diameter 44 at the exhaust side 46.

The injection hole 41 shown in FIG. 5 has a rounding 47 at its intake side 45 which may be produced by hydraulic erosion.

A longitudinal center axis 48 of the particular injection hole 41 defines the longitudinal center axis 23 of the injection jet 22, and together with the longitudinal center axis 9 of the cylinder 2 encloses an angle 49 which is one-half the spray cone angle 24.

The auto-ignition combustion process presented here is provided for direct-injection internal combustion engines. It may preferably be implemented in diesel engines. In principle, the auto-ignition combustion process presented here is also conceivable for gasoline engines, provided that they operate with direct injection.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A combustion method having auto-ignition for direct-injection internal combustion engines, comprising:
   the internal combustion engine having at least one cylinder with a combustion chamber laterally delimited by a cylinder wall, and is delimited axially on one side by a cylinder head, and is delimited axially on a second side by an adjustable-stroke piston in the cylinder,
   the piston having an annular circumferential piston step axially recessed in the piston relative to an annular circumferential piston crown, and which via an annular circumferential jet divider contour merges into a piston cavity axially recessed in the piston relative to the piston step,
   an injection nozzle situated in the cylinder head being associated with the particular cylinder, wherein for a combustion operation in auto-ignition mode the injection nozzle simultaneously injects multiple injection jets into the combustion chamber in a star-shaped pattern, wherein the injection jets are each divided at the jet divider contour into a first partial quantity, a second partial quantity, and third partial quantities, the first partial quantity entering into the piston cavity, the second partial quantity entering via the piston step into a region between the piston crown and the cylinder head, and the third partial quantities, starting from the respective injection jet, spreading out on both sides in the peripheral direction in opposite directions along the piston step, and the respective third partial quantities colliding with one another between two adjacent injection jets within the piston step and being deflected radially inwardly, the first partial quantity and the second partial quantity forming a first combustion front and a second combustion front, and the partial quantities which in each case are jointly deflected inwardly forming a third combustion front radially inwardly into a gap between the injection jets, and wherein the injection jets are deflected above the piston cavity upstream from the jet divider contour in a direction of the piston by a resulting flow formed essentially from a swirl flow, a squish gap flow, and a jet flow, wherein a flow vector of the resulting flow includes a portion that forms above the piston cavity and coaxially with respect to a longitudinal center axis of the cylinder in a direction of the piston cavity.

2. The method of claim 1, wherein the injection jets first strike the jet divider contour off-center and offset toward the piston cavity, during the injection spread over the center of the jet divider contour, and strike the jet divider contour offset toward the piston step.

3. The method of claim 1, wherein the injection jets initially strike the jet divider contour off-center and offset toward the piston cavity, and in the course of the injection subsequently strike the jet divider contour.

4. The method of claim 1, wherein the injection nozzle produces 10 to 12 injection jets at the same time.

5. The method of claim 1, wherein the injection jet is introduced during an injection duration of 40 crankshaft angle degrees maximum.

6. The method of claim 1, wherein the injection jets are injected at a spray cone angle in an angular range of 152°±1°.

7. The method of claim 6, wherein the spray cone angle spreads out essentially coaxially with respect to the piston.

8. The method of claim 1, wherein the injection jets are introduced into the combustion chamber at an injection pressure of 500 bar to 2800 bar.

9. The method of claim 1, wherein the first partial quantity is deflected in an undercut in the piston cavity.

10. The method of claim 9, wherein the undercut is up to 3% of a piston diameter.

11. An internal combustion engine, comprising:
a cylinder having combustion chamber laterally delimited by a cylinder wall, and axially delimited on one side by a cylinder head and on second by an adjustable-stroke piston in the cylinder;
an injection nozzle situated in the cylinder head,
wherein the piston has an annular circumferential piston step axially recessed in the piston relative to an annular circumferential piston crown, and which via an annular circumferential jet divider contour merges into a piston cavity axially recessed in the piston relative to the piston step, wherein, for a combustion operation in auto-ignition mode, the injection nozzle is configured to simultaneously inject multiple injection jets into the combustion chamber in a star-shaped pattern, wherein the injection jets are each divided at the jet divider contour into a first partial quantity, a second partial quantity, and third partial quantities, wherein the first partial quantity enter into the piston cavity, the second partial quantity enter via the piston step into a region between the piston crown and the cylinder head, and the third partial quantities, starting from the respective injection jet, spread out on both sides in the peripheral direction in opposite directions along the piston step, and the respective third partial quantities colliding with one another between two adjacent injection jets within the piston step and being deflected radially inwardly, wherein the first partial quantity and the second partial quantity form a first combustion front and a second combustion front, and the partial quantities which in each case are jointly deflected inwardly forming a third combustion front radially inwardly into a gap between the injection jets, wherein a resulting flow, which is formed essentially from a swirl flow, a squish gap flow, and a jet flow, deflects the injection jets above the piston cavity upstream from the jet divider contour in the direction of the piston, wherein a flow vector of the resulting flow includes a portion that forms above the piston cavity and coaxially with respect to a longitudinal center axis of the cylinder in a direction of the piston cavity.

12. The internal combustion engine of claim 11, wherein the swirl flow has an i-theta of 4.5 maximum.

13. The internal combustion engine of claim 12, wherein the swirl flow is changeable corresponding to operating conditions.

14. The internal combustion engine of claim 11, wherein the cylinder includes a squish gap at top dead center of the piston, axially between the piston crown and the cylinder head, wherein the squish gap has an axial height in a range of approximately 0.4% to approximately 1.2% of the piston diameter, or has a radial length in a range of approximately 9% to approximately 14% of the piston diameter.

15. The internal combustion engine of claim 11, wherein the piston step has a radial extension of 4% to approximately 20% of a piston diameter, and an axial height of approximately 2.5% to 7% of the piston diameter.

16. The internal combustion engine of claim 11, wherein the injection nozzle multiple injection holes, each having a ratio of a hole length to a hole diameter which is in a range of approximately 4 to approximately 8.

17. The internal combustion engine of claim 16, wherein the injection holes have a conical design and taper from an intake side to an exhaust side.

18. The internal combustion engine of claim 17, wherein a hole diameter at the intake side, is larger than a hole diameter at the exhaust side in a range of approximately 5% to approximately 15%.

19. The internal combustion engine of claim 11, wherein the piston is equipped with a piston cone situated coaxially and centrally in the piston cavity and which has a cone angle of approximately 124°±5°.

20. The internal combustion engine of claim 11, wherein the injection holes have a rounding at an intake side, the flow increase achieved via the rounding being in a range of approximately 10% to approximately 20%.

* * * * *